United States Patent
Kiyama et al.

(10) Patent No.: US 9,296,967 B2
(45) Date of Patent: Mar. 29, 2016

(54) SOLID FUEL

(75) Inventors: Michihiro Kiyama, Hiroshima (JP); Masayuki Yamamoto, Tokyo (JP)

(73) Assignee: CREATIVE CO., LTD., Hiroshima (JP)

( * ) Notice: Subject to any disclaimer, the term of this patent is extended or adjusted under 35 U.S.C. 154(b) by 397 days.

(21) Appl. No.: 13/822,507

(22) PCT Filed: Sep. 17, 2010
(Under 37 CFR 1.47)

(86) PCT No.: PCT/JP2010/066182
§ 371 (c)(1),
(2), (4) Date: Jun. 26, 2013

(87) PCT Pub. No.: WO2012/035650
PCT Pub. Date: Mar. 22, 2012

(65) Prior Publication Data
US 2014/0190073 A1    Jul. 10, 2014

(51) Int. Cl.
*C10L 5/44* (2006.01)
*C10L 7/02* (2006.01)
*C10L 5/14* (2006.01)
*C10L 5/36* (2006.01)
*C10L 5/40* (2006.01)

(52) U.S. Cl.
CPC ... *C10L 5/44* (2013.01); *C10L 5/14* (2013.01); *C10L 5/363* (2013.01); *C10L 5/40* (2013.01); *C10L 5/403* (2013.01); *C10L 5/442* (2013.01); *C10L 5/445* (2013.01); *C10L 7/02* (2013.01); *C10L 2200/0484* (2013.01); *C10L 2250/04* (2013.01); *Y02E 50/10* (2013.01); *Y02E 50/30* (2013.01)

(58) Field of Classification Search
CPC .......................................... C10L 5/44
USPC ................................... 44/550–590
See application file for complete search history.

(56) References Cited

U.S. PATENT DOCUMENTS

| | | | |
|---|---|---|---|
| 4,326,854 A | 4/1982 | Tanner | |
| 5,221,290 A * | 6/1993 | Dell | 44/554 |
| 5,893,946 A * | 4/1999 | Landis | 106/38.2 |
| 7,785,379 B2 * | 8/2010 | Drisdelle et al. | 44/535 |
| 8,721,746 B2 * | 5/2014 | Kiyama | 44/535 |
| 8,801,812 B2 * | 8/2014 | Kiyama | 44/589 |
| 2009/0031619 A1 | 2/2009 | Maman et al. | |
| 2010/0300368 A1 * | 12/2010 | Myers et al. | 119/171 |
| 2011/0078947 A1 | 4/2011 | Kiyama | |
| 2013/0004904 A1 * | 1/2013 | Kiyama | 431/2 |
| 2013/0008358 A1 | 1/2013 | Kiyama | |
| 2013/0247456 A1 * | 9/2013 | Dale et al. | 44/535 |
| 2014/0082997 A1 * | 3/2014 | Kiyama et al. | 44/535 |

FOREIGN PATENT DOCUMENTS

| | | |
|---|---|---|
| JP | 57-57796 | 4/1982 |
| JP | 57-135894 | 8/1982 |
| JP | 61-28589 | 2/1986 |
| JP | 62-43490 | 2/1987 |
| JP | 7-82581 | 3/1995 |
| JP | 8-143868 | 6/1996 |
| JP | 2000-230181 | 8/2000 |
| JP | 2004-285312 | 10/2004 |
| JP | 2009-292873 | 12/2009 |
| JP | 2010-18725 | 1/2010 |
| JP | 2010-65154 | 3/2010 |

OTHER PUBLICATIONS

Extended European Search Report in regards to European Application No. 10857284.3, dated Jun. 12, 2014.
U.S. Appl. No. 13/822,505 to Michihiro Kiyama et al., which was filed on Mar. 12, 2013.
Search report from International Application No. PCT/JP2010/066182, mail date is Nov. 2, 2010.

\* cited by examiner

*Primary Examiner* — Ellen McAvoy
(74) *Attorney, Agent, or Firm* — Greenblum & Bernstein, P.L.C.

(57) ABSTRACT

[Object] To provide a solid fuel which comprises a binder, a form retaining agent and a vegetable oil-containing substance in a balanced manner, has a stable calorific value and suppresses the production of carbon dioxide.

[Solution] A solid fuel formed from a mixture of a binder, a form retaining agent and a vegetable oil-containing substance, wherein the amount of the binder is 1 to 85 parts by weight, the amount of the form retaining agent is 1 to 55 parts by weight, and the amount of the vegetable oil-containing substance is 10 to 85 parts by weight based on 100 parts by weight of the mixture, and the mixture is molded.

20 Claims, No Drawings

SOLID FUEL

BACKGROUND OF THE INVENTION

1. Field of the Invention

The present invention relates to a solid fuel. More specifically, it relates to a solid fuel which makes effective use of a binder, a form retaining agent and a vegetable oil-containing substance. Much more specifically, it relates to a solid fuel which makes effective use of a binder and a form retaining agent derived from natural products while using a vegetable oil-containing substance, produces as small an amount as possible of a harmful gas or residue, has a large calorific value and leads to the suppression of the production of carbon dioxide, especially a solid fuel suitable for use as a fuel for power generation.

2. Prior Art

The causes of global warming which is one of the global environmental issues include an increasing amount of carbon dioxide existent in air. Various approaches to the suppression of the production of carbon dioxide are being made on a global basis. As one of the approaches, the production of biofuels and use of them in automobiles and power boilers as alternatives to fossil fuels such as coal and gasoline are underway. However, use of foods such as corn which are used as raw materials of the biofuels is breaking down ecological balance and economical balance and therefore it cannot be said that this is the best approach. Thus, it is necessary to take the global environment into consideration while effects on clothing, food and housing whose balance is essential to human lives are minimized. Since this is a very difficult problem to be solved, various studies are under way but the problem is not solved yet. Then, a solid fuel making use of plastics is used in power boilers as an alternative to oil and coal but it cannot be said that its effect of suppressing the production of carbon dioxide is satisfactory.

Meanwhile, Patent Documents 1 to 3 propose the recycling of wood waste, paper waste and plastic waste into a solid fuel.

Patent Document 1 proposes a solid fuel which makes use of used paper and plastic waste. This solid fuel actually comprises 25 to 100 parts by weight of plastic waste based on 100 parts by weight of used paper. Thus, a relatively large amount of plastic waste (20 to 50 wt % of the total) is used. Although this Patent Document 1 teaches that a wood-based waste material may be further used, the amount of the wood-based waste material used in Examples is no more than 10 wt % of the total. The above solid fuel contains plastic waste in a relatively large proportion and therefore, the step of dechlorinating the obtained solid fuel by heating it is required to suppress a trouble caused by the inclusion of polyvinyl chloride at the time of combustion.

Patent Document 2 proposes a solid fuel obtained by pressure bonding together plastics, wooden powders, bark and used paper and molding the obtained product into a pellet. Although the amount of the plastics contained in the solid fuel is specified as 10 to 80%, judging from FIGS. 2 to 4, the amount of the plastics is estimated at 30% or more, preferably 50% or more.

Patent Document 3 proposes a method of obtaining a fuel by kneading 5 to 10 parts by weight of a synthetic resin-based waste material with 100 parts by weight of a wood-based waste material and pelletizing the kneaded product. The pellet obtained by this method has a small diameter of about 6 to 12 mm, it cannot be said that the calorific value of the pellet is sufficiently large, and further, its form retention stability is unsatisfactory. Therefore, the pellet is unsuitable for use as a solid fuel for thermal power generation.

Meanwhile, along with the frequent occurrence of a widescale disaster which is seemed to be caused by the global warming phenomenon in recent years, each country is trying to suppress the production of carbon dioxide which is one of greenhouse effect gases but it can be said that this is still unsatisfactory. Then, solid fuels making use of various waste products are used in power boilers as alternatives to oil and coal but it can be said that their effect of suppressing the production of carbon dioxide is still unsatisfactory.

That is, since plastics are used as a binder and a fuel source in the solid fuels proposed by the above Patent Documents 1 to 3, considering that the plastics are produced from oil, these solid fuels are unsatisfactory in the effect of suppressing the production of carbon dioxide.

PRIOR ART DOCUMENTS

Patent Documents

Patent Document 1: JP-A 7-82581
Patent Document 2: JP-A 57-57796
Patent Document 3: JP-A 62-43490

SUMMARY OF THE INVENTION

Problem to Be Solved by the Invention

Then, the inventors of the present invention conducted intensive studies to develop a solid fuel which can be used as an energy source capable of suppressing the production of carbon dioxide without using plastics derived from oil. As a result, they found that, when a vegetable oil-containing substance which is a natural resource is used in place of waste wood, used paper and plastics which have been used in the prior art and mixed with a binder and a form retaining agent derived from natural products in a certain ratio and the resulting mixture is molded, a solid having a certain shape and a certain size can be formed, and this solid has excellent form retaining ability, has a large calorific value as a fuel, rarely produces a harmful gas or a harmful residue, greatly serves to suppress the production of carbon dioxide as all the raw materials are derived from natural plants and is useful as a solid fuel for power generation. Thus, according to the present invention, there can be provided a solid fuel which can be used for power generation as a clean energy source because all of its raw materials are derived from plants without using plastics which have been used in the prior art.

Means for Solving the Problem

According to the present invention, there is provided the following solid fuel.

1. A solid fuel which is formed from a mixture of a binder (component A), a form retaining agent (component B) and a vegetable oil-containing substance (component C), wherein the amount of the component A is 1 to 85 parts by weight, the amount of the component B is 1 to 55 parts by weight, and the amount of the component C is 10 to 85 parts by weight based on 100 parts by weight of the mixture, and the mixture is compression molded.
2. The solid fuel in the above paragraph (1), wherein the total amount of the components A and B is 15 to 90 parts by weight based on 100 parts by weight of the mixture.
3. The solid fuel in the above paragraph (1), wherein the amount of the component C is 10 to 80 parts by weight based on 100 parts by weight of the mixture.

4. The solid fuel in the above paragraph (1), wherein the weight ratio of the component A to the component B is 1:25 to 85:1.
5. The solid fuel in the above paragraph (1), wherein the binder (component A) is starch derived from sea alga.
6. The solid fuel in the above paragraph (1), wherein the form retaining agent (component B) is natural rubber.
7. The solid fuel in the above paragraph (1), wherein the vegetable oil-containing substance (component C) is the fruit seed of *Ricinus communis* or *Jatropha curcas*, or a pulverized product thereof.
8. The solid fuel in the above paragraph (1) having an average size of 10 to 100/cm$^3$ each.
9. The solid fuel in the above paragraph (1) which is prismatic or cylindrical in shape.
10. The solid fuel in the above paragraph (1) having an apparent specific gravity of 0.3 to 0.6 g/cm$^3$.
11. The solid fuel in the above paragraph (1) having a calorific value of 20 to 30 MJ/kg.
12. The solid fuel in the above paragraph (1) which is used for thermal power generation.

Effect of the Invention

The solid fuel of the present invention can be effectively used as a new energy source, especially an energy source for power generation, by using a binder, a form retaining agent and a vegetable oil-containing substance in a balanced manner. The solid fuel of the present invention can be a new type of solid fuel which rarely produces a harmful gas or a harmful residue, has a large calorific value and leads to the suppression of the production of carbon dioxide.

The binder and the form retaining agent serve as binders and the vegetable oil-containing substance effectively serves to secure a certain amount of heat in the solid fuel of the present invention, thereby making it possible to mold a solid fuel. Since the solid fuel of the present invention comprises a binder and a form retaining agent derive from plants and a vegetable oil-containing substance without using plastics derived from oil, it has a remarkable effect of suppressing the production of carbon dioxide.

BEST MODE FOR CARRYING OUT THE INVENTION

The solid fuel of the present invention is a solid obtained by molding a mixture of a binder, a form retaining agent and a vegetable oil-containing substance. A description is subsequently given of the ratio of raw materials and a molding method.

(a) Binder

The binder is starch collected from sea alga containing alginic acid, as exemplified by agarose, carrageenan, curdlan and glucomannan. At least one dried binder out of these or a combination of a binder and a form retaining agent may be used. The binder is cut or severed to a size of 1 to 50 mm. The term "size" as used herein means the size of a binder passing through a sieve having an opening of 50 mm or less. The binder may be powdery.

(b) Form Retaining Agent

Natural rubber or a natural rubber-containing product is used as the form retaining agent. Examples thereof include guar gum, tara gum, locust bean gum, tamarind seed gum, psyllium seed gum, gum arabic, gellan gum, curdlan, pectin, cellulose, chitin, chitosan, xanthan gum, karaya gum, arabinogalactan, ghatti gum, tragacanth gum, furcellan, pullulan, *aeromonas* gum, *agrobacterium succinoglycan*, *azotobacter vinelandii* gum, linseed gum, almond gum, welan gum, *erwinia mitsuensis* gum, gum elemi, *enterobacter* gum, *enterobacter simanus* gum, oligoglucosamine, *cassia* gum, carob bean gum, glucosamine, *artemisia sphaerocephala* seed gum, *sclero* gum, *sesbania* gum, dextran, triacanthos gum, *abelmoschus manihot*, macrophomopsis gum, rhamsan gum, levan, daruman resin, peach gum and tamarind. At least one dried form retaining agent out of these or a combination of a form retaining agent and a binder may be used.

Out of these, guar gum, tara gum, locust bean gum, tamarind seed gum, psyllium seed gum, gellan gum, curdlan, xanthan gum, gum arabic, pectin, cellulose, chitin, chitosan, xanthan gum, karaya gum and carob bean gum are preferred, and guar gum, tara gum, locust bean gum, tamarind seed gum, psyllium seed gum, gellan gum, curdlan and xanthan gum are most preferred.

The form retaining agent is cut or severed to a size of 1 to 50 mm. The term "size" as used herein means the size of a form retaining agent passing through a sieve having an opening of 50 mm or less. The form retaining agent may be powdery.

(c) Vegetable Oil-containing Substance

*Sapium sebiferum*, *Quercus suber*, millet, rice, food carbide, flax, jute, ramie, kenaf, *Abutilon avicennae*, roselle, *Musa basjoo*, *Juncus effuses* L. var. *decipens Buchen.*, *Cyperus monophyllus Vahl*, okra, *Morus bombycis*, banana, pineapple, *Agave Tequilana*, sarago, wisteria, linden, bamboo, reed, esparto, sabai grass, *Alpinia zerumbet*, *Hermerocallis aurantiaca*, raran grass, morochi grass, papyrus, ryusu grass, *Pueraria lobata*, *Edgeworthia chrysantha*, aotan, cashew nut, oat, lupine, calendula, coffee, hazelnut, spurge, pumpkin, coriander, mustard seed, *Carthamus tinctorius*, cacao, Tenderstem broccoli, *Brassica campestris*, macadamia nut, nuts, *Ricinus communis*, *Jatropha curcas*, palm, sugarcane, *Sorghum bicolor*, potato, wheat, *Oryza sativa*, olive, sunflower, soybean, safflower, peanut, willow, poplar, switchgrass, elephant grass, *Evodiopanax innovans*, cactus, lumber, sugar beet, *Pistacia chinesis Bunge*, cotton, copaiba, *Pongamia pinnata*, jojoba, *Euphorbia tirucalli*, *Zea mays*, sweet potato, *Sargassum fulvellum*, sesame, cardoon, avocado, kusabinoki, quinua, *Guizotia abyssinica*, hemp and paulownia are used as the vegetable oil-containing substance. *Sapium sebiferum*, *Ricinus communis*, *Jatropha curcas*, palm, sugarcane, *Zea mays* and processed residues thereof are preferred and used as heat sources for burning the solid fuel as a fuel at a power generation facility. The term "processed residues" means press cakes obtained after oil is squeezed out of the fruits and seeds of *Sapium sebiferum*, *Quercus suber*, millet, rice, food carbide, flax, jute, ramie, kenaf, *Abutilon avicennae*, roselle, *Musa basjoo*, *Juncus effuses* L. var. *decipens Buchen.*, *Cyperus monophyllus Vahl*, okra, *Morus bombycis*, banana, pineapple, *Agave Tequilana*, sarago, wisteria, linden, bamboo, reed, esparto, sabai grass, *Alpinia zerumbet*, *Hermerocallis aurantiaca*, raran grass, morochi grass, papyrus, ryusu grass, *Pueraria lobata*, *Edgeworthia chrysantha*, aotan, cashew nut, oat, lupine, calendula, coffee, hazelnut, spurge, pumpkin, coriander, mustard seed, *Carthamus tinctorius*, cacao, Tenderstem broccoli, *Brassica campestris*, macadamia nut, nuts, *Ricinus communis*, *Jatropha curcas*, palm, sugarcane, *Sorghum bicolor*, potato, wheat, *Oryza sativa*, olive, sunflower, soybean, safflower, peanut, willow, poplar, switchgrass, elephant grass, *Evodiopanax innovans*, cactus, lumber, sugar beet, *Pistacia chinesis Bunge*, cotton, copaiba, *Pongamia pinnata*, jojoba, *Euphorbia tirucalli*, *Zea mays*, sweet potato, *Sargassum fulvellum*, sesame, cardoon, avocado, kusabinoki, quinua, *Guizotia abyssinica*, hemp and paulownia. The fruit seeds of *Sapium sebiferum*, *Ricinus communis*, *Jatropha cur*- cas, palm, sugarcane and *Zea mays* or pulverized products thereof are preferred. Out of these, the fruit seeds of *Sapium sebiferum, Ricinus communis* and *Jatropha curcas* or pulverized products thereof are particularly preferred. These vegetable oil-containing substances are cut or severed to a size of 1 to 50 mm. The term "size" as used herein means the size of a vegetable oil-containing substance passing through a sieve having an opening of 50 mm or less. Although seeds are mainly used, branches or trunks may be partially mixed.

(d) Composition

The amount of the component A is 1 to 85 parts by weight, the amount of the component B is 1 to 55 parts by weight, and the amount of the component C is 10 to 85 parts by weight based on 100 parts by weight of the mixture of all the components. The total amount of the components A and B is 15 to 90 parts by weight, preferably 20 to 85 parts by weight, and the amount of the component C is preferably 15 to 80 parts by weight.

Further, the weight ratio of the component A to the component B is 1:25 to 85:1, preferably 1:29 to 80:1.

Within the above ranges, the solid fuel of the present invention can be solidified by using relatively small amounts of a binder, a form retaining agent and a vegetable oil-containing substance, whereby the calorific value becomes stable. When the total amount of the binder and the form retaining agent is 15 to 90 parts by weight, the amount of the vegetable oil-containing substance is desirably 10 to 85 parts by weight. This ratio is changed by the desired calorific value of the solid fuel.

(e) Molding Method

A mixture of the above binder, form retaining agent and vegetable oil-containing substance in the above ratio is preferably pressurized and compressed such that they are closely dispersed.

A method in which the binder and the vegetable oil-containing substance are pre-mixed together and the form retaining agent is mixed with the resulting mixture is particularly preferred, and a single-screw or double-screw extruder may be used as a mixing machine. The use of a double-screw extruder is particularly desirable. A composition which has been compressed and extruded by the extruder is ejected from a prismatic or circular nozzle and cut to a suitable length to obtain a prismatic or cylindrical molded product.

A solid fuel having a desired size can be obtained by setting the diameter of the cylindrical nozzle to 5 to 50 mm and the cut length to 10 to 100 mm.

(f) Characteristic Properties of Solid Fuel

Since the solid fuel of the present invention is preferably manufactured by the above molding method industrially, the shape thereof is desirably cylindrical or prismatic and particularly advantageously cylindrical. The size of the solid fuel is each desirably 10 to 100 cm$^3$ on average in terms of volume. The apparent specific gravity of the solid fuel is desirably in the range of 0.3 to 0.6 g/cm$^3$.

The calorific value of the solid fuel is stable at 20 to 30 Mj/kg. Therefore, the solid fuel of the present invention comprises the binder, the form retaining agent and the vegetable oil-containing substance in a balanced manner, has a highly stable calorific value and a great effect of suppressing the production of carbon dioxide and therefore is advantageously used as a fuel for thermal power generation.

EXAMPLES

The following examples are provided to further illustrate the present invention.

The following binder, form retaining agent and caloric augmentation agent were used in the following examples.

(a) Binder

The binder was obtained by crushing dried carrageenan (size of 25 mm or less).

(b) Form Retaining Agent

Guar gum powders were used as the form retaining agent.

(c) Vegetable Oil-containing Substance

A seed collected from the cultivated *Ricinus communis* and a residue thereof.

Example 1

10 parts by weight of the component B was mixed with a mixture of 48 parts by weight of the component A and 42 parts by weight of the component C, and the resulting mixture was extruded by a double-screw extruder to obtain a cylindrical solid fuel having a diameter of about 35 mm (length of 50 mm). The apparent specific gravity (bulk specific gravity), calorific value, chlorine content and form retention stability test result of this solid fuel are shown in Table 1.

Example 2

5 parts by weight of the component B was mixed with a mixture of 15 parts by weight of the component A and 80 parts by weight of the component C, and the resulting mixture was extruded by a double-screw extruder to obtain a cylindrical solid fuel having a diameter of about 35 mm (length of 50 mm). The apparent specific gravity (bulk specific gravity), calorific value, chlorine content and form retention stability test result of this solid fuel are shown in Table 1.

Example 3

50 parts by weight of the component B was mixed with a mixture of 1 parts by weight of the component A and 49 parts by weight of the component C, and the resulting mixture was extruded by a double-screw extruder to obtain a cylindrical solid fuel having a diameter of about 35 mm (length of 50 mm). The apparent specific gravity (bulk specific gravity), calorific value, chlorine content and form retention stability test result of this solid fuel are shown in Table 1.

Example 4

5 parts by weight of the component B was mixed with a mixture of 80 parts by weight of the component A and 15 parts by weight of the component C, and the resulting mixture was extruded by a double-screw extruder to obtain a cylindrical solid fuel having a diameter of about 35 mm (length of 50 mm). The apparent specific gravity (bulk specific gravity), calorific value, chlorine content and form retention stability test result of this solid fuel are shown in Table 1.

TABLE 1

| | Product: solid fuel | | | | | |
|---|---|---|---|---|---|---|
| | Size (length) mm | bulk specific gravity g/cm$^2$ | Calorific value Joule (MJ/Kg) | Calorific value Calorie (cal/g) | Chlorine content % | Form retention stability |
| Ex. 1 | 50 | 0.44 | 24.03 | 5739.16 | 0.042 | satisfactory |
| Ex. 2 | 50 | 0.58 | 29.67 | 7086.20 | 0.049 | satisfactory |
| Ex. 3 | 50 | 0.41 | 24.72 | 5903.82 | 0.075 | satisfactory |
| Ex. 4 | 50 | 0.34 | 20.09 | 4799.50 | 0.068 | satisfactory |

<Form Retention Stability Test on Solid Fuel>

The form retention stability of each of the solid fuels obtained in the above Examples 1 to 4 was checked. The expression "weight ratio of pieces" means the ratio of the total weight of pieces having a size of about 10 cm$^3$ or less obtained by sieving the solid fuel to the weight of the solid fuel before sieving.

The form retention stability was checked by loading 500 kg of the solid fuel after molding into a transport vehicle from a storage installation twice by using a reach loader.

The evaluation results are as follows.

Example 1: The solid fuel has a good molded state and retains a certain shape and a certain size even at the time of delivery to a storage installation (weight ratio of pieces: 3%)

Example 2: The solid fuel has a good molded state and retains a certain shape and a certain size even at the time of delivery to a storage installation (weight ratio of pieces: 5%)

Example 3: The solid fuel has a good molded state and retains a certain shape and a certain size even at the time of delivery to a storage installation (weight ratio of pieces: 3%)

Example 4: The solid fuel has a good molded state and retains a certain shape and a certain size even at the time of delivery to a storage installation (weight ratio of pieces: 2%)

(evaluation: weight ratio % of pieces)

0 to 5%: good
6 to 10%: moderate
11 to 15%: bad

What is claimed is:

1. A solid fuel which is formed from a mixture of a binder comprising starch derived from sea alga (component A), a form retaining agent comprising natural rubber (component B) and a vegetable oil-containing substance comprising the fruit seed of *Ricinus communis* or *Jatropha curcas*, or a pulverized product thereof (component C), wherein the amount of the component A is 1 to 85 parts by weight, the amount of the component B is 1 to 55 parts by weight, and the amount of the component C is 10 to 85 parts by weight based on 100 parts by weight of the mixture, and the mixture is compression molded.

2. The solid fuel according to claim 1, wherein the total amount of the components A and B is 15 to 90 parts by weight based on 100 parts by weight of the mixture.

3. The solid fuel according to claim 1, wherein the amount of the component C is 10 to 80 parts by weight based on 100 parts by weight of the mixture.

4. The solid fuel according to claim 1, wherein the weight ratio of the component A to the component B is 1:25 to 85:1.

5. The solid fuel according to claim 1 having an average size of 10 to 100 cm$^3$ each.

6. The solid fuel according to claim 1 which is prismatic or cylindrical in shape.

7. The solid fuel according to claim 1 having an apparent specific gravity of 0.3 to 0.6 g/cm$^3$.

8. The solid fuel according to claim 1 having a calorific value of 20 to 30 MJ/kg.

9. The solid fuel according to claim 1 which is for thermal power generation.

10. The solid fuel according to claim 2, wherein the amount of the component C is 10 to 80 parts by weight based on 100 parts by weight of the mixture.

11. The solid fuel according to claim 10, wherein the weight ratio of the component A to the component B is 1:25 to 85:1.

12. The solid fuel according to claim 11 having an average size of 10 to 100 cm$^3$ each.

13. The solid fuel according to claim 12 which is prismatic or cylindrical in shape.

14. The solid fuel according to claim 13 having an apparent specific gravity of 0.3 to 0.6 g/cm$^3$.

15. The solid fuel according to claim 14 having a calorific value of 20 to 30 MJ/kg.

16. The solid fuel according to claim 2, wherein the weight ratio of the component A to the component B is 1:25 to 85:1.

17. The solid fuel according to claim 16 having an average size of 10 to 100 cm$^3$ each.

18. The solid fuel according to claim 17 which is prismatic or cylindrical in shape.

19. The solid fuel according to claim 18 having an apparent specific gravity of 0.3 to 0.6 g/cm$^3$.

20. The solid fuel according to claim 19 having a calorific value of 20 to 30 MJ/kg.

* * * * *